Oct. 10, 1933.  K. W. MILLER  1,929,509
APPARATUS FOR BUILDING CABLE JOINTS
Original Filed Sept. 10, 1927   6 Sheets-Sheet 1
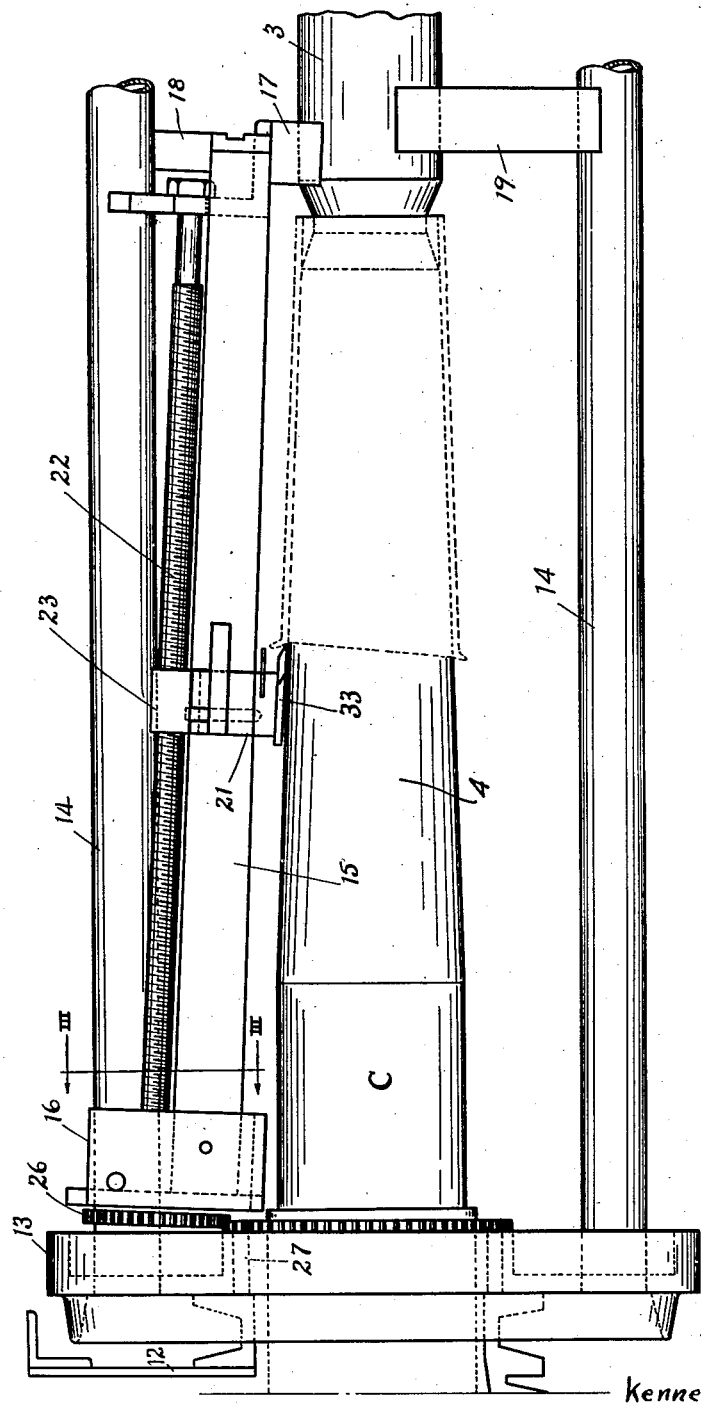
FIG. I
INVENTOR
Kenneth W. Miller
by Christy Christy & Wharton
his attorneys

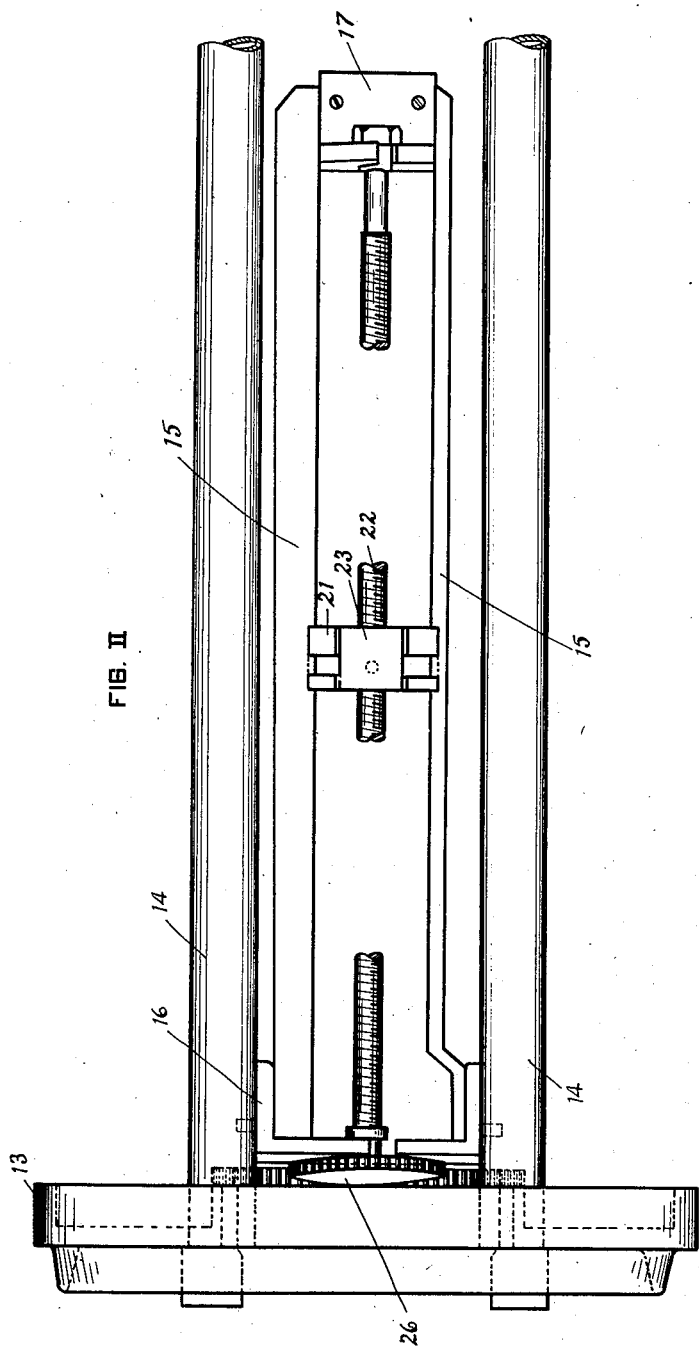

Oct. 10, 1933.    K. W. MILLER    1,929,509
APPARATUS FOR BUILDING CABLE JOINTS
Original Filed Sept. 10, 1927    6 Sheets-Sheet 3
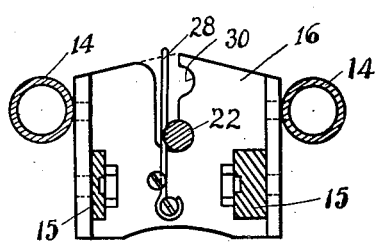
FIG. III
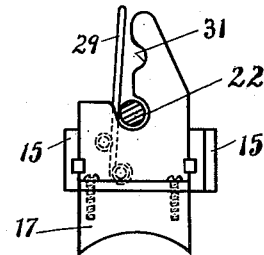
FIG. IV
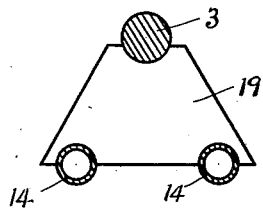
FIG. VI
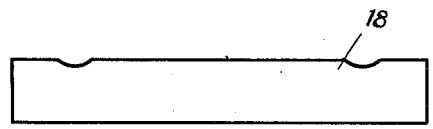
FIG. V
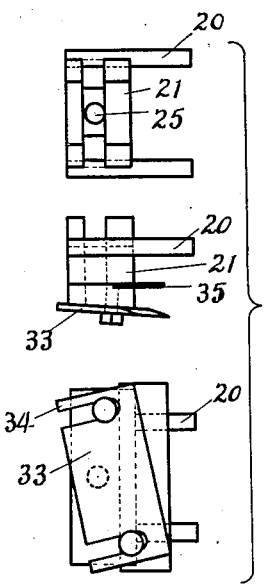
FIG. VIII
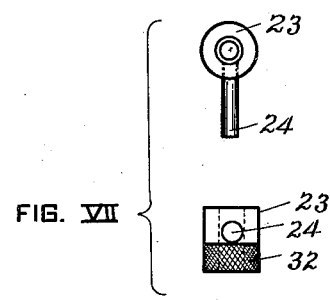
FIG. VII
INVENTOR
Kenneth W. Miller
by Christy Christy and Wharton
his attorneys

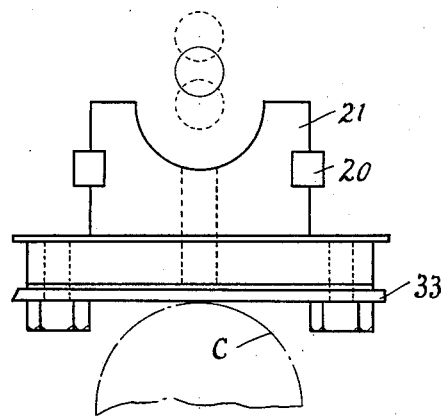
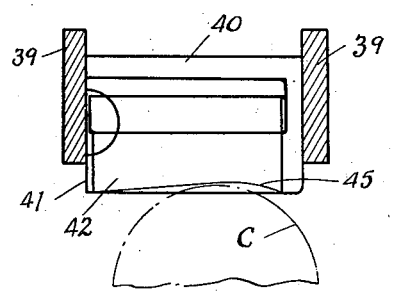
FIG. IX  FIG. XII
FIG. XIII
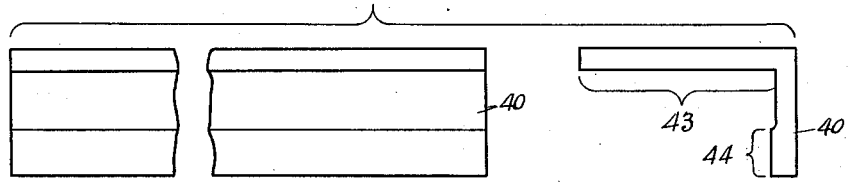
FIG. XIV  FIG. XV
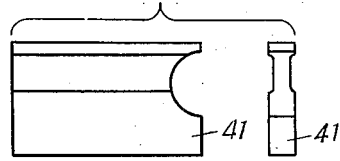 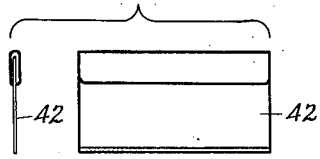
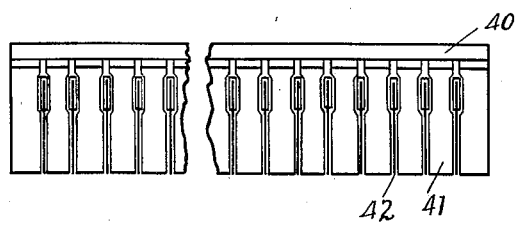
FIG. XVI

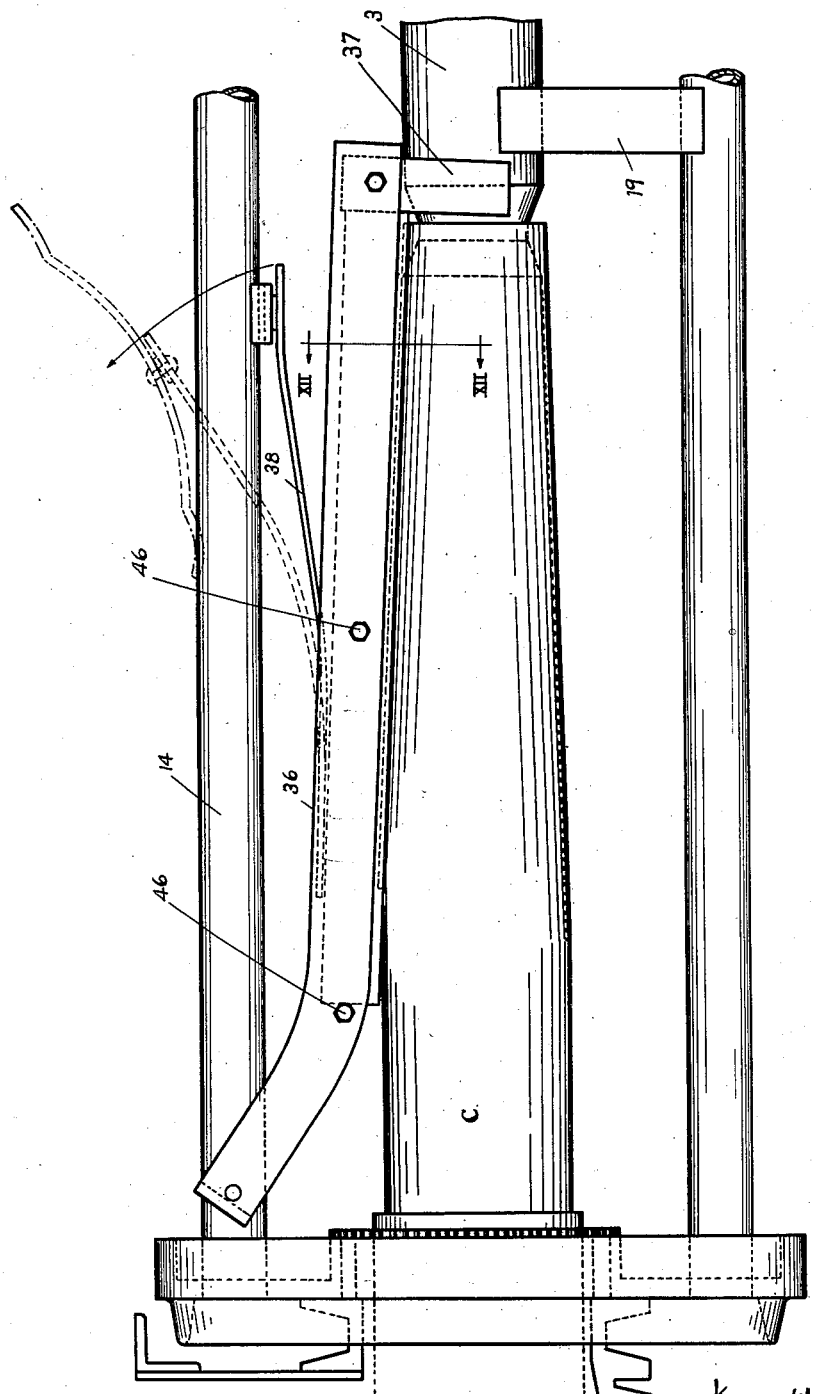

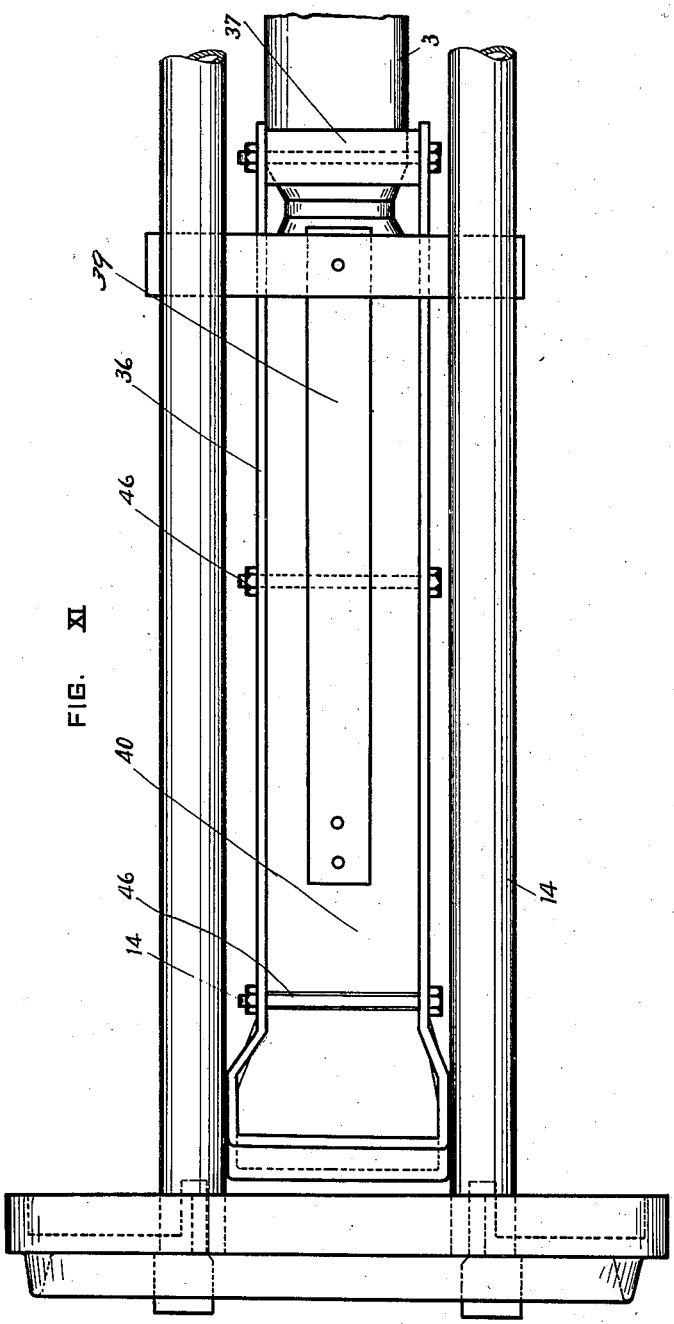

Patented Oct. 10, 1933

1,929,509

UNITED STATES PATENT OFFICE 1,929,509

APPARATUS FOR BUILDING CABLE JOINTS

Kenneth W. Miller, Chicago, Ill., assignor, by mesne assignments, to General Cable Corporation, a corporation of New Jersey Original application September 10, 1927, Serial No. 218,793. Divided and this application September 5, 1929. Serial No. 390,441

9 Claims. (Cl. 82—4)

My invention relates to the building of joints for high-tension electric cables, and consists in improvements in the apparatus for building such joints; and particularly pertains to apparatus for building the cable joint shown and described in Letters Patent of the United States No. 1,776,127 granted September 16, 1930, on an application, Serial No. 218,793, filed September 10, 1927. This application is a division from the application upon which the said Letters Patent were granted.

My invention is illustrated in the accompanying drawings. Fig. I is a fragmentary view in side elevation, showing an incompletely formed joint. The cable ends are here in place within a joint-building tank, the conductor ends have been electrically connected, and a penciling arm is shown diagrammatically in operating position with respect to the body of the machine-laid insulation upon the cable end. This body of insulation is, in the operation indicated, in course of preparation for subsequent application to it of a wrapped-on body of insulating material. Fig. II is a view of the same apparatus, seen in plan from above. Fig. III is a view in cross-section through the penciling arm, on the plane indicated at III—III, in Fig. I. Fig. IV is a view in end elevation (right-hand end, Figs. I and II) of the penciling arm. Figs. V and VI illustrate in elevation certain details in the setting of the penciling arm. Fig. VII shows in end elevation and in plan from beneath, the traveling nut with which the penciling arm is equipped. Fig. VIII shows in plan from above, in side elevation, and in plan from beneath, the knife block of the penciling arm. Fig. IX shows the knife block in front elevation, as viewed from right to left in Fig. I, Fig. X is a view in side elevation, corresponding to Fig. I, and illustrating preliminary cutting apparatus. Fig. XI is a view of the apparatus of Fig. X, seen in plan from above. Fig. XII is a view in cross-section through the cutter arm, on the plane indicated at XII—XII, Fig. X. Figs. XIII, XIV and XV show in side and end elevation the component parts of the knife structure. Fig. XVI shows in side elevation the assembly of these component parts.

The invention is adapted to use in association with a tank for building cable joints under oil such as that shown in United States Letters Patent No. 1,613,911, granted January 11, 1927, on the application of Donald M. Simons, and in such association I here show and describe it.

As stated in my aforesaid patent, No. 1,776,127, and according to the disclosure of the Simons patent just cited, the tank with which the apparatus of my present invention may in practice be associated is provided with opposite end walls, adapted to receive and engage in liquid-tight closure upon them the two cable ends to be united. These cable ends are by the engagement of the end walls of the tank held to axial alignment. The Simons patent describes the preliminary exposure of the conductor ends, before the cable ends are introduced within the tank; it describes the electrical connecting of the conductor ends within the tank, the cutting back of the ends of the envelopes of machine-laid insulation, and the wrapping upon the connecter and between the ends of the envelopes of machine-laid insulation (and under oil), of a web of flexible, sheet insulation. The tank contains a rotary cage, rotatable upon the axis of the cable structure under treatment, and the cage carries the sheet insulation in a roll, and in the progress of operation this sheet insulation is unwound from the roll and wound upon the cable structure.

According to the teaching of the said Simons patent, and according to the disclosure of United States Letters Patent No. 1,585,127, granted May 18, 1926, on the joint application of the said Simons and Frank D. Barbour, the ends of machine-laid insulation are prepared for the wrapping on of a web of sheet insulation between them by cutting them either into successions of receding steps or into tapering conical or "penciled" form, and the web of sheet insulation is correspondingly cut, to fit the space between the opposed ends of the two envelopes of machine-laid insulation and in a single wrap to fill all the space. The penciled formation is preferable to the stepped formation; the "riser" of the step is of no electrical consequence nor advantage; it is the "tread" of the step, the surface which extends in parallelism with the cable axis, upon which electrically secure union is made; and I find that a web wrapped under oil upon a penciled end of the envelope of machine-laid insulation (particularly if the penciling be done as hereinafter described and if the web of wrapped-on material be shaped as described in my Patent No. 1,776,127 above noted), will be electrically and mechanically secure and capable of practical and economical production.

The machine of the Simons and Barbour Patent No. 1,585,127 is advantageously arranged within a tank, such as that of the Simons Patent 1,613,911, and within the tank the joint is built. The cable ends are introduced in axial alignment through the end walls of the tank, and within the tank a cage is rotatable on the axis of the cable structure. This cage carries the web or webs of material of which the wrapped body of joint insulation is built, and by rotation of the cage the material is laid down to form such body. This building of the body may be done under oil; and in that case before wrapping begins the tank is filled with oil, submerging the cable structure.

Referring to Fig. I, a portion of the end wall of the tank is indicated at 12. The cable structure within the tank is indicated at C, and a portion of the rotatable cage is shown, including the head 13 and the longitudinal rods 14. Between two adjacent rods 14 of the cage and at opposite ends of the cage, two arms are removably pivoted to swing in a plane which is radial with respect to the axis of the cable structure. Each arm is composed of two guide bars 15 which extend in parallelism between and which unite a base block 16 and a bearing block 17. The bolt connection of bars 15 to base block 16 (indicated in Fig. III) may be through enlarged openings, to allow minute adjustment (a range of a quarter of an inch is adequate), for precise adaptation of the machine to the work in hand. It is by the base blocks 16 that the arms are pivotally mounted between the rods 14 of the cage of the machine.

The block 17 is held to bearing upon the connecter 3 by means of a pillow block 18, removably interposed between rods 14 and bearing block 17. In order that this bearing of the block 17 upon the connecter 3 shall be firm, a supporting block 19 is interposed on the opposite side of the connecter, and between the connecter and opposite rods 14 of the cage (see Figs. I and VI). This block 19, like block 18, is removable, and is taken away when the pencil cut has been completed.

In ways formed for them in guide bars 15 the shoes 20 with which a knife-block 21 is equipped have bearing, to the end that the knife-block may move longitudinally of and yet be firmly sustained in the arm.

In the opposite blocks 16 and 17 of the penciling arm a screw 22 is rotatably mounted, and the thread upon screw 22 is normally in mesh with a nut 23 which is borne by the knife-block 21. The nut 23 carries a radially extending thrust pin 24 which enters a bore 25 formed for it on the knife-block 21, and by such provision the nut is securely carried in the knife-block, in the assembled position shown in Figs. I and II. Rotation of the screw, manifestly, will effect travel of the knife-block 21 in the ways prepared for it in the guide bars 15. The engagement of thrust pin 24 with knife-block 21 is such that it is undisturbed by any such minute adjustment of guide arms 15 upon base block 16 as may be found desirable.

The screw 22 at the end adjacent the head 13 of the cage (the left-hand end, Figs. I and II) is equipped with a pinion 26, and pinion 26 meshes with teeth formed in or integral with the collar 27 through which the cable body C enters the tank, the collar 27 being integral with the tank end 12. Rotation of the cage will effect simultaneously the travel of the knife-block around the axis of rotation and the advance of the knife-block longitudinally of the cable. The screw 22 may conveniently be formed of a standard threaded three-eighth inch screw rod; the pinion 26 may be of an inch and a half pitch diameter, twelve pitch spur gear; and this, with intermeshing gearing of substantially the proportions indicated, will give a rate of advance of knife-block 21 of about three sixteenths of an inch for each revolution of the block around the cable axis.

The screw 22 is held to its bearings in the blocks 16 and 17, with the pinion 26 in mesh with the gear teeth in collar 27, by means of springs 28 and 29 (Figs. III and IV), and the blocks 16 and 17 are provided with a second pair of bearing recesses 30 and 31, in which the same springs may alternatively hold the screw 22 seated for rotation. When the knife-block in its operation has advanced from left to right, Figs. I and II, to the limit of its range, or so far as is needful, and is to be returned to initial position, the structure last indicated affords means for ready return. The screw 22 is slipped from the operative position shown in Figs. III and IV to position in seats 30 and 31. When in that position pinion 26 is free from the gear teeth in collar 27, and the thrust pin 24 is free of the knife-block 21, and then the nut 23 may readily be turned and carried back along the screw, from right to left. When this has been done the knife-block may be replaced. With this feature of operation in view, the surface of nut 23 may be knurled, as indicated at 32, Fig. VII. The alternate positions of the screw 22 relatively to knife-block 21 are, in Fig. IX, indicated by dotted circles.

The block 21 carries in its lower face the knife 33. The edge of the knife is toward the connector 3, the knife extends in a plane somewhat angular with respect to the arm which carries it, being tipped somewhat from heel to edge, towards the cable axis (see side elevation, Fiv. VIII). The edge extends obliquely to the path of travel, advancing somewhat from front to rear in direction toward the connector (see plan from beneath, Fig. VIII). The knife is bolted to the knife-block, and the bolt holes are prolonged into notches 34, so that the knife may be adjusted in its minute position, and also may easily be removed and replaced. The edge of the knife preferably is beveled on a slope of about 1:4. The knife-block carries above the knife a deflector plate 35 for shavings. The position of the knife for operation upon the enveloped cable C is sufficiently indicated in Figs. VIII and IX. When the cutting apparatus is set for operation, the penciling arm preferably is inclined toward the cable axis at a slope of about 1:18. Such position is indicated in Fig. I.

At the beginning of operation the edge of the knife extends tangentially upon the envelope of machine-laid insulation; the line of its edge is oblique to a transverse plane through the cable body; and the blade is inclined angularly toward the cable axis. The knife then rests on the body of insulation at the point where penciling is to begin, and at this time the whole may be submerged in a body of oil within the tank. Rotation of the cage then causes the knife to advance, cutting as it advances, along a spiral cut which conforms to the desired penciled surface. The cut-away paper is removed as cutting progresses. It will be understood without particular showing that, with proper duplication of instrumentalities, correlative in shape and position, duplicate opposite and symmetrical and of course properly spaced pencil cuts may be made simultaneously upon the oppositely disposed ends of the two bodies of insulation which surround the cable ends whose conductors are united in the connecter 3.

If the action of the knife, arranged and operated as I have described, be studied, it will be perceived that the tapered surface cut by the knife on the end of the body of machine-laid insulation will not be perfectly conical; its profile will not be a perfectly straight line, but a slightly waved line. Such spirally extending ripples upon the otherwise smooth surface may be reduced in size by decreasing the rate of advance of the knife; and this may be effected by provision of a feed screw of slighter pitch. But, considering the elastic character of the material (such as varnished cambric) which is to be wrapped in edge-to-edge engagement upon the penciled surface, and considering from the electrical point of view the characteristics of leakage surfaces, such ripples are even to be desired. The rippled surface upon the pencil, accordingly, is peculiarly adapted to receive the scalloped-edge (described in my aforesaid Patent No. 1,776,127) of the applied web of varnished cambric, and cooperates with a so-formed web to afford an electrically secure union.

It is not to be expected that the knife described can cut away a strip of wrapped-on paper insulation of a depth greater than about an eighth of an inch. And, accordingly, I preferably combine with the instrumentalities described instrumentalities for preliminarily rough-cutting the ends of the envelopes of insulation to a pencil exceeding the ultimate size by about an eighth of an inch. This rough-cutting may be done, and preferably will be done, in air, before the structure within the tank is submerged (if, indeed, ultimate cutting under oil be desired). It is easier to do the rough-cutting in air; the trimmings may easily be removed; and such incidental defects in the cut edge of the body of insulation as cutting in air may produce are in the subsequent finishing cut wholly removed—particularly if the finishing cut is performed under oil. Furthermore, in consequence of rough-cutting in air, the quantity of the debris of cutting which (if the oil tank be used) must be filtered out of the oil is very greatly reduced.

The instrumentalities for rough-cutting the penciled ends of the envelopes of machine-laid insulation are illustrated in Figs. X–XVI. Between two of the cage bars 14, I removably pivot, symmetrically and adjacent the opposite ends of the cage, two arms 36, adapted to swing on their pivots in planes which are radial with respect to the axis of the cable body C within the tank. Each of the arms is provided at its outer end, the end remote from the pivot point, with a block 37 which in the course of operation makes bearing upon the connecter 3 of the cable joint. By such bearing the ranges of swing of the arms 36 are limited. Springs 38 tend to swing the arms inward toward the axis of the cable, to effect cutting. The supporting block 19, already mentioned, is put in place before the rough-cutting begins, and remains in place while both the rough-cutting and the subsequent pencil-cutting are performed.

Arms 36 are equipped, each with a succession of knives spaced at intervals along the arm and extending transversely, and adapted at their edges to bear upon the body of machine-laid insulation of the cable C and, as the arms swing toward the axis of the cable, to sink their cuts into the body of insulation.

Each arm 36 includes two parallel bars 39, bolted together, and by the bolts adapted to make clamping engagement upon the knife structure assembled between.

The knife structure includes an angle bar 40, a plurality of spacer blocks 41, and a plurality of blades 42. The angle bar may be a brass casting; the spacer blocks may be cut from a brass strip ¼″ x ⅞″, suitably recessed to afford the shape shown in the drawings; and the blades may be safety-razor blades of the familiar form shown. In making assembly, the blades are initially wrapped separately, each in a single thickness of paper; the so-wrapped blades and the spacers are then stacked and assembled in the angle bar, in their approximate ultimate positions, as illustrated in Figs. XII and XVI. The parts being so assembled, the spacer blocks 41 are tinned to the angle bar 40 over the surfaces 43 and 44. When this has been done, the blades are removed from between the spacer blocks. A recess 45 then is formed in the lower face of the assembly of spacer blocks 41. The blades, unwrapped from their papers, are then replaced between the spacer blocks and the assembly then is clamped, as by bolts 46, between the bars 39 of the arm 36. Suitable space may be formed in the knife structure for the extension through it of one or more of such clamping bolts. The structure in this respect, it will be perceived, not only admits of minute adjustment of the knife structure in its position upon the arm to meet the conditions of the work in hand, but admits of some latitude of placement of knife structures variously proportioned, to operate upon cables variously proportioned.

The knife structure may, alternatively, be built more lightly and after the following manner: The bar 40 may be formed of sheet metal—steel or brass—say three thirty-seconds of an inch thick, and bent to shape, to form an angle member of the general shape shown in Fig. XIII, but preferably with closed ends. At the ends the meeting edges of the bent sheet will be soldered. The spacer blocks 41 may be made of hard, close-grained wood. A long strip of wood may be worked to the desired shape (Fig. XIV) in cross-section—a bit wider at the heel (the upper edge, Fig. XIV), to afford allowance for the thickness of the blade. The strip may then be sawed into blocks of the length desired. These blocks then may be stacked and clamped in place in the member 40, with strips of fibre of proper thickness inserted between. The blocks may then be secured in member 40 by brads, conveniently three brads to each block, driven through holes bored for their passage through member 40, two brads being driven into the top of each block (Fig. XIV) and one into the end. The head of the brad driven into the end of the block should be countersunk. When the parts have so been assembled, the recess 45 may be cut and finished with sandpaper. The fibre strips may then be removed, and the structure will then be finished, ready to receive the blades. The advantages of the alternative structure will be found to consist both in relative lightness and in a certain degree of elasticity.

The spring 38, it will be observed, may be anchored in bar 40.

The engagement of the knives upon the envelope of machine-laid insulation is diagrammatically shown in Fig. XII, where the arc c indicates the contour of such envelope.

Thus it appears that each arm carries, in a long block adjustably clamped to place upon it, a gang of cutting blades. The blades conveniently succeed one another at regular intervals of a quarter of an inch; each blade has conveniently such exposure as to sink a cut an eighth of an inch deep; and the proportions and adjustment are such that, on the completion of the preliminary cutting operation, the envelope of insulation upon the cable has been cut in the rough to a taper of approximately 1:18.

Operation of this preliminary cutter is (if the tank is to be used) within the tank, of course, but it preferably is performed before the tank is filled with oil, and it is performed, accordingly, in air. The cable ends being secured in the end walls of the tank, and the conductor ends having been electrically united by the connecter 3, the preliminary cutter comes into play. The envelopes of machine-laid insulation have previously been cut back sufficiently to expose the conductor ends for connection, but it will be understood that under actual conditions of operation the previously cut ends of the envelopes on either side of the connecter are spaced at intervals which, though approximately constant, are minutely indeterminate and variable. The two ends of these envelopes of machine-laid insulation are in the practice of my invention to be laid back in penciled cuts which, spaced apart, shall face one another at an interval which shall be practically exact.

The two cutter arms 36 with their accurately situated gangs of cutter blades are precisely located. They are brought into play, engaging under spring pressure the envelopes of insulation upon the cable ends. Rotation of the cage within the tank effects cutting. Cutting begins at the ends near the connecter, the right-hand end, Fig. X. Each successive knife sinks into the body of insulation before the next knife in the succession comes into play, and as cutting progresses, the knives come into play, one after another, until all are effective. Cutting continues until the block 37 comes to bearing upon connecter 3.

The paper as it is cut away is removed. Since the paper insulation has been spiralled on, the cut of the blades releases curls of paper which may be pulled away. And if these released strips be drawn aside while rotation of the cutter continues, further cutting will sever the strips at the knives. The cutaway paper may be removed by means of a hook or by the fingers of the attendant. And at any time as cutting progresses the cutter arm may be swung aside, to facilitate removal of the debris.

By virtue of the fact that the preliminary cut is made upon the cable when in place within the tank, the position of the cut is accurate, both with respect to the ensuing steps of the finishing cut and the wrapping on of new insulation. There is no longitudinal displacement. And, by virtue of the fact that it may be and preferably is performed in air, the cutting may be expeditiously performed and the debris may easily be removed. Relatively little cutting under oil remains to be done, and the accumulation of paper debris in the bath of oil is, in consequence, relatively small in quantity.

Since the knife arms revolve coaxially about the cable and since the cutting operation is brought to an end by engagement of blocks 37 upon connecter 3, the penciling will be truly conical and coaxial with the cable. It is true, as has already been said, that the conductor may extend in a position diverging slightly from true concentricity, and a position slightly eccentric with respect to the penciled cut formed by the means and in the manner described, but the only electrical effect of such slight eccentricity will be a very small but "smooth" shift of voltage stresses. The location and accuracy of the pencil will be much more perfect that the circumstances require.

Because of the possible slight eccentricity just alluded to, it is to be expected that the roughing cut will leave a rather shaggy-surfaced pencil. It will suffice to tear off the free ends and the longest loops, and then to proceed with inundation in oil and the making of the finishing cut. The rough-cutting instrumentalities may be duplicated and operate simultaneously upon the two ends of machine-laid insulation on the two sides of the electrical union.

After rough-cutting, the arms 36 may be removed, and in their stead the penciling arms illustrated in Figs. I and II may be secured to the rods 14 of the cage. Block 19 remaining in place, the penciling arms are brought to position with their end blocks 17 securely bearing upon the connecter 3. The tank may then be filled with oil, and the finishing cuts are made and the surfaces 4 established. The cutting instrumentalities may then be removed, and the webs which are initially carried in rolls upon the cage, as described in the Simons and Barbour patent are then secured at their ends to the connecter 3 and by the rotation of the cage wrapped to form the insulation of the joint, united upon the penciled surfaces, after the manner and with the effect described in my Patent No. 1,776,127, above noted.

I claim as my invention:

1. In a joint-building machine for electric cables, the combination of a cage rotatable on the axis of the joint in course of building, an arm removably borne by the cage and adapted to rest upon the connecter of such joint, a cutter movable upon said arm, and means for causing the cutter to move relative to the arm in response to cage rotation.

2. In a joint-building machine for electric cables, the combination of a cage rotatable on the axis of the joint in course of building, an arm pivotally mounted on the cage and adapted to rest upon the connecter of such joint, a cutter movable upon said arm, and means for causing the cutter to move relative to the arm in response to cage rotation.

3. In a joint-building machine for electric cables the combination of means for supporting in axial alignment two cable ends whose bared conductor ends are united, a cage rotatable relatively to such support and coaxially with such united cable ends, and arm pivotally borne by the cage and resting upon the connected conductor ends, a cutter movable longitudinally upon said arm, and means for causing the cutter to move in response to cage rotation.

4. In a joint-building machine for electric cables the combination of means for supporting in axial alignment two cable ends whose bared conductor ends are united, a cage rotatable relatively to such support and coaxially with such united cable ends, and two cutting instrumentalities adapted to be severally mounted upon and removed from said frame, one of said instrumentalities including an arm adapted to be pivotally borne by the said cage and to rest upon the connected conductor ends and including also a cutter movable longitudinally upon said arm, and the other of the two said instrumentalities including an arm adapted to be pivotally borne by the said cage and a gang of blades spaced in succession upon the arm and adapted as the arm moves pivotally upon the cage to sink simultaneously into a body of machine-laid cable insulation to successively less distances from the inner to the outer end of the arm.

5. In a joint-building machine for electric cables the combination of a tank, a cage rotatable within the tank on the axis of the joint in course of building, and a cutter longitudinally movable within said cage.

6. In a joint-building machine for electric cables the combination of a tank including a cage rotatable within the tank around the joint in course of building, a cutter mounted within said cage and means for causing the cutter to move within the cage in response to cage rotation.

7. In a machine for making cable joints the combination of means for clamping two cable ends in aligned position, means for cutting away portions of the insulation from the clamped cable ends, and means for causing said cutting means to move in a tapering helical path around the clamped cable ends.

8. In a machine for preparing a cable end for jointing the combination of means for clamping a cable at a point adjacent its end, means for cutting away a portion of the insulation from the cable end, means for causing said cutting means to move in a helical path around and to bear upon the cable end, and deflection-resisting means engaging the cable end beyond the holding means and affording opposition to the pressure exerted by the cutting means.

9. The combination in a joint-building machine for electric cables, of an insulation cutter including an arm pivoted at one end to said cage and at its other end spring-driven in radial plane with respect to the axis of the joint under construction, and a gang of blades spaced in succession along said arm and adapted to sink simultaneously into the body of cable insulation to successively greater distances from the pivoted toward the spring-driven end of the arm.

KENNETH W. MILLER.